United States Patent [19]

Horowitz et al.

[11] Patent Number: 4,607,241
[45] Date of Patent: Aug. 19, 1986

[54] TRANSVERSAL FILTER EQUALIZER WITH MINIMALLY INTERACTIVE ADJUSTMENTS

[75] Inventors: Harvey M. Horowitz, Laguna Hills; Dominique H. Veillard, San Diego, both of Calif.

[73] Assignee: Eastman Kodak Company, Rochester, N.Y.

[21] Appl. No.: 734,306

[22] Filed: May 15, 1985

[51] Int. Cl.[4] .................. H03H 15/00; H03H 7/03
[52] U.S. Cl. ........................... 333/166; 333/28 R; 364/825
[58] Field of Search ............ 333/28 R, 166, 18, 20, 333/138–140; 364/724, 824, 825; 375/11–14; 358/905; 178/63 E, 69 B, 71 H; 179/175.31 E

[56] References Cited

U.S. PATENT DOCUMENTS 3,611,201 10/1971 Goell ........................ 333/166 X
4,434,308 2/1984 Rzeszewski .................. 333/18 X Primary Examiner—Marvin L. Nussbaum
Attorney, Agent, or Firm—Robert F. Cody

[57] ABSTRACT

In a transversal filter equalizer, such as one using a tapped delay line, the present invention combines the symmetrically located pairs of tap signals, by means of adders and subtracters, to provide partial output signals which are separately controlled in amplitude and phase. These partial output signals, which have no d.c. components, are then summed with a partial signal derived from the center tap reference signal to reinsert the d.c. component and to provide the equalized output signal.

10 Claims, 9 Drawing Figures

TRANSVERSAL FILTER EQUALIZER WITH MINIMALLY INTERACTIVE ADJUSTMENTS

BACKGROUND OF THE INVENTION

Field of the Invention

This invention relates to a transversal filter equalizer, and in particular to a transversal filter equalizer with independent amplitude and phase controls.

The invention, as well as the prior art, will be described with reference to the figures, of which:

Description Relative to the Prior Art

The use of equalization to correct transmission channel distortion is well known in the prior art. Early applications were in telephony where "loading coils" were used to compensate for the high frequency attenuation experienced in twisted pair transmission lines. While these "loading coil" equalizers improved the line attenuation characteristics, they did not help the channel phase shift. The problem of phase equalization in telephony was not, however, generally troublesome or acute since the ear is relatively insensitive to phase distortion. The lumped constant equalizer was later developed and was used in analog transmission channels where the emphasis was also on amplitude correction rather than on phase compensation. With the advent of digital and video signal transmission the phase correction requirement became increasingly important. Intersymbol interference in digital data transmission results more from channel phase distortion than amplitude distortion. Similarly, non linear phase shift in video transmission results in asymmetrical distortion of the video signal which is detrimental to picture quality.

A significant improvement in the art of equalization was provided by the development of the transversal filter equalizer. It provided a way to compensate for both channel amplitude and phase distortion, making it attractive for use in digital and video transmission.

Figure 1:
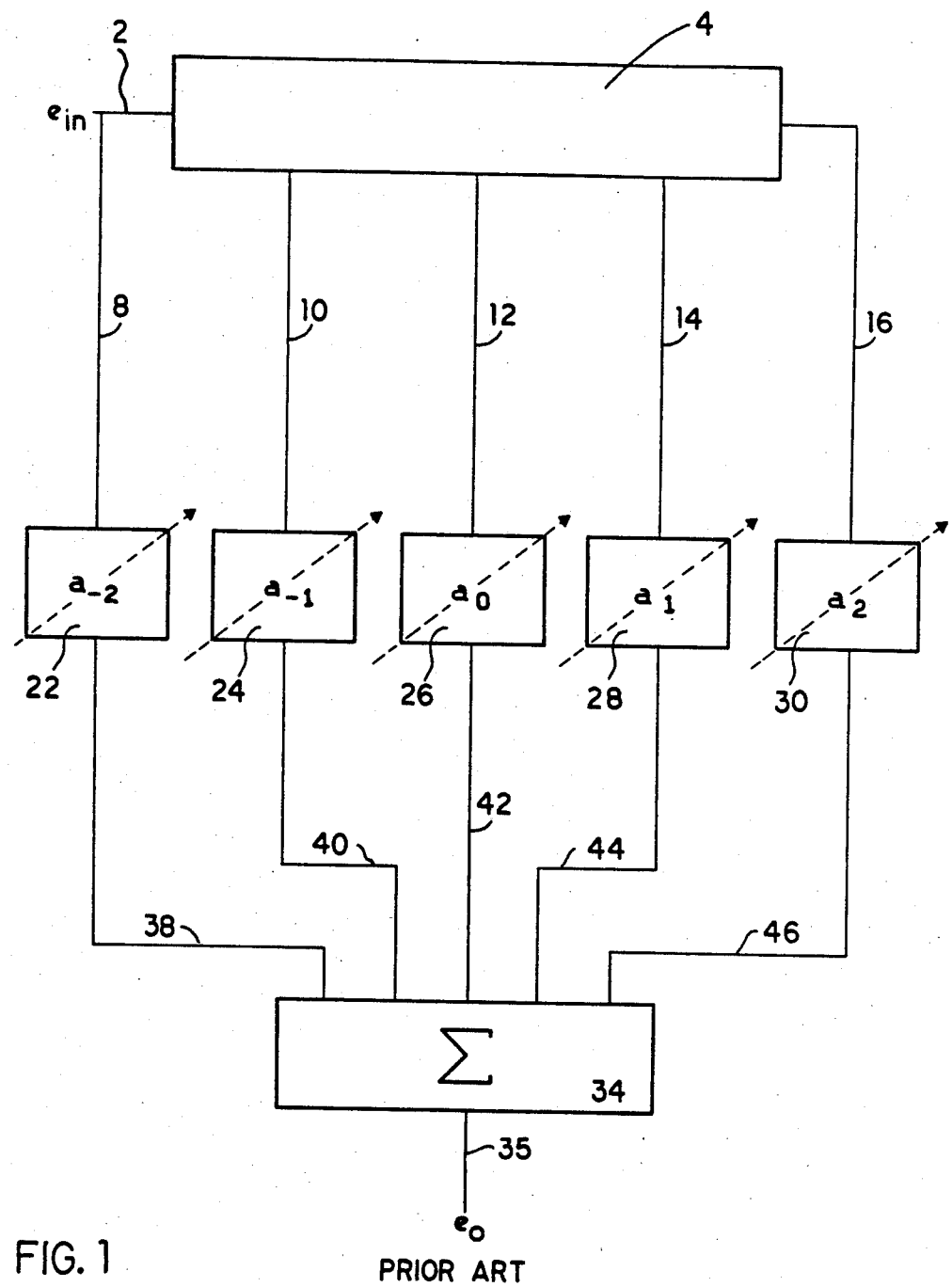
FIG. 1 is a block diagram of a transversal filter equalizer known in the prior art.

The transversal filter of the prior art is illustrated in FIG. 1. An input signal $e_{in}$ is applied (lead 2) to a tapped delay line 4. Multipliers, 22 through 30, are associated with respective taps, 8 through 16, and multiplication of each tap signal by a factor adjustable between +1 and −1 is performed. The delays between taps are equal; the taps 10, 14, and 8, 16 are pairwise symmetrically located with respect to a center tap 12. Equalization is accomplished by adjusting the magnitude and sign of the gain of each multiplier to provide signals which are then summed in an adder 34. The resultant signal $e_o$ (lead 35) possesses the required overall amplitude and phase correction.

Figure 2A:
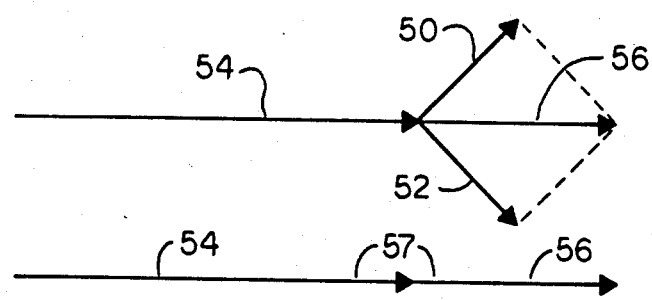
FIGS. 2a through 2c are a set of vector diagrams of representative signals useful in understanding the prior art and the invention.

An understanding of the basic operation of the transversal filter equalizer may be obtained by consideration of FIG. 1 and FIG. 2. [In the drawings different, but related, elements are identified with the same reference character, albeit that one element's reference character may be unprimed while that of its related element is primed.] Because of the symmetry of the apparatus of FIG. 1, it is conventional to reference all signals to the multiplier 26 output signal 42 derived from the center tap 12. The initial description deals with the effects of summing the first pair of signals from the taps 10 and 14 and the center tap 12 signal. Assume the gain of the multiplier 26 is +1, and the gains of the multipliers 24 and 28 are set at a smaller value, say, +0.5. In FIG. 2a, vectors 50 and 52 represent the output signals 40 and 44 from the multipliers 24 and 28, and the vector 54 represents the output signal 42 from the multiplier 26. The vector 50 leads the vector 54 by the same amount that the vector 52 lags the vector 54 since the delays between taps are all equal. As the input signal $e_{in}$ increases in frequency, the vector 50 rotates counterclockwise (as viewed in FIG. 2a) relative to the vector 54 and the vector 52 rotates clockwise by the same amount. Under these assumed conditions, the vector sum of the vectors 50, 52, i.e. the vector 56, changes amplitude as a function of frequency in a sinusoidal manner. FIG. 2a shows that only the amplitude changes; the resultant vector 56 is always in the same direction as the vector 54. Thus the vector 57, i.e., the sum of the vector 54 and the vector 56, is in the direction of the vector 54. This configuration of the transversal filter equalizer therefore provides the capability for pure amplitude equalization since relative phase is not affected.

It is known (Bennett and Davey, "Data Transmission"—McGraw Hill Book Co. 1965, p. 270) that the period of rotation of the vectors 50 and 52 is equal to the time delay between adjacent taps. By extension, therefore, it will be appreciated that the signals available from the next pair of taps 8,16 will rotate with half the period of the signals from the taps 10,14; and if additional taps were present the next pair would complete a rotation again in half the previous period. If all pairwise multipliers are set to the same gain (sign and magnitude) it will be appreciated by extrapolation of the above, as well as from the diagram of FIG. 2a, that all the summed vectors lie in the same direction; there is only amplitude change and no phase change. The effect of adding the signals from the additional taps 8,16 is to increase the frequency range over which the FIG. 1 equalizer operates. The assumed configuration still provides only amplitude equalization.

Figure 2B:
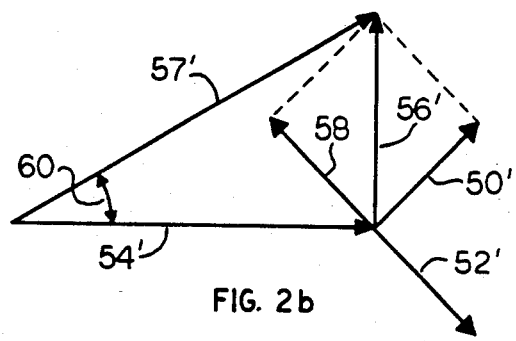
Figure 2C:
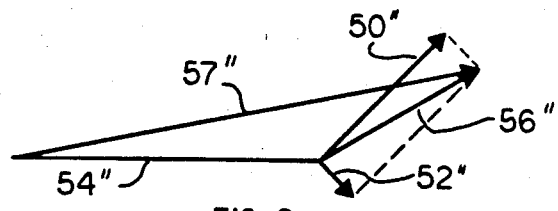
Figure 3A:
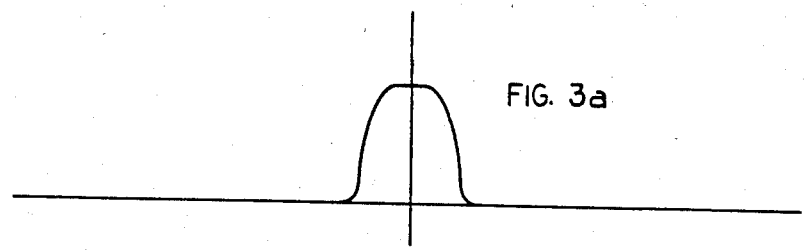
FIGS. 3a through 3d are a set of waveforms illustrating the performance of the invention in the equalization of a pulsed electrical signal.
Figure 3B:
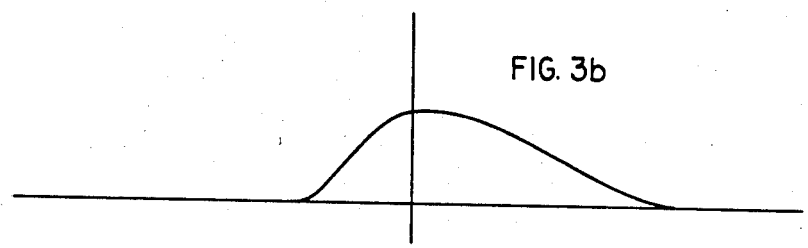
Figure 3C:
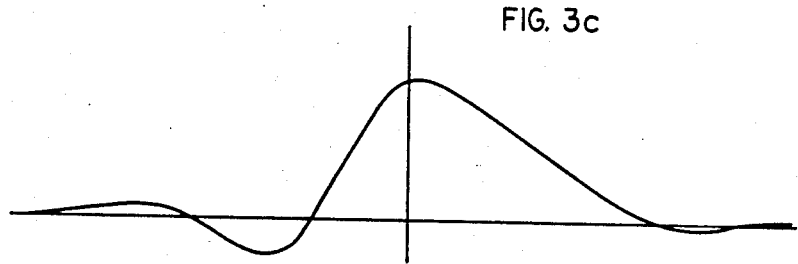
Figure 3D:
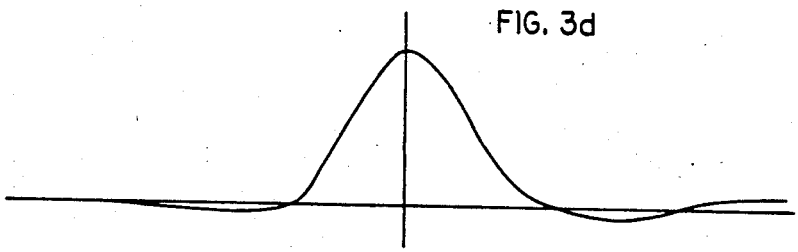

If, on the other hand, the gains of the multipliers 24,28 are set at the same magnitude, say 0.5, but of opposite signs, the equalizer will primarily modify only the phase of the signal. The situation is illustrated in FIG. 2b. The vector 58 is the vector 52' multiplied by (−1). When added to the corresponding vector 50', the resultant is the vector 56' which is at 90° relative to the vector 54'. The vector 57', i.e., the sum of the vectors 54' and 56', has now been shifted by an angle 60 relative to the vector 54'. As the input signal frequency varies, the vectors 58 and 50' rotate, and the vector 56' varies in length in a sinusoidal manner. This causes the phase angle 60 to vary sinusoidally also; however, the amplitude of the output vector 57' stays approximately the same length as the reference vector 54'. In this configuration equalizer adjustment essentially only affects the phase.

In the general case, when both amplitude and phase are to be compensated, the gain [sign and magnitude] of the multipliers must be individually adjusted. When the pairwise signals from corresponding multipliers have different amplitudes, their addition leads to both phase shift and amplitude change. This may be seen in FIG. 2c where the vectors 50″ and 52″ are adjusted for the same sign but different magnitudes. The resultant vector 57″ has an increased length and is shifted in phase with respect to the reference vector 54″.

This dependence of phase and amplitude on each individual multiplier gain makes adjustment of a prior art equalizer a difficult task which becomes more severe as the number of tapes increases. This problem is well recognized in the art. For example, in discussing the use of multitap equalizers for pulse equalization, it has been pointed out that: "If corrections approaching the amplitude of the pulse peak are required, many echo taps are necessary and the adjustments are so interdependent that a manual solution becomes difficult and tedious". ["Data Transmission", Bennett and Davy, supra, page 272].

An additional problem of the prior art transversal filter equalizer is that each multiplier gain adjustment thereof varies the d.c. component of the output since each tap signal has a d.c. component. This is particularly troublesome in video applications where the d.c. component sets the contrast range from black to white. In other words, each tap adjustment causes the contrast to change.

It is problems such as these that the present invention addresses, providing a transversal filter equalizer with independent phase and amplitude controls, and freedom from adjustment-dependent d.c. shift, resulting in substantially simpler equalizer adjustment.

SUMMARY OF THE INVENTION

In a transversal filter equalizer, rather than equalize by adjusting the individual tap multiplier gains and summing the resultant signals with attendant simultaneous amplitude and phase changes of the output signal and shift in the d.c. component, the present invention teaches combining the symmetrically located pairs of tap signals to provide partial output signals which are separately controlled in amplitude and phase. These partial output signals, which have no d.c. component, are then summed with a partial signal derived from the center tap reference signal to reinsert the d.c. component and to provide the equalized output signal.

Each pair of delay line symmetrically located taps are so interconnected as to provide the two partial signals. One signal is derived from the sum of two equal amplitude tap signals, which, as was previously described utilizing FIG. 2a, generates a signal in phase with the reference signal. The second signal is derived from the difference of two equal amplitude tap signals which, as was previously described utilizing FIG. 2b, generates a signal orthogonal to the reference signal. Control of the magnitude of the sum signal before addition to the reference signal with which it is in phase, allows independent control of the output signal amplitude equalization. Control of the difference signal magnitude before addition shifts the phase of the output signal with respect to the reference signal allowing independent control of phase equalization.

The signals from all pairs of symmetrically located taps are separately combined in the manner described. Amplitude and phase equalization controls corresponding to the above controls are provided, and these allow independent adjustment for the higher frequency components of the signal being equalized.

The invention, as referred to above, controls amplitude and phase in the frequency domain. The improvement effected by the invention may also be appreciated by consideration of its performance relating to equalization of signals in the time domain, which is the domain of interest for digital and video signals.

The performance of the invention considered in the time domain may be understood by reference to FIG. 3. FIG. 3a illustrates a pulse which is to be transmitted through a channel which causes amplitude and phase distortion, and which distortion is to be corrected by the equalizer of the invention. The effect of transmitting the pulse without any equalization is shown in FIG. 3b. The pulse has spread out, which is a characteristic result due to channel high frequency losses caused by amplitude distortion, and the pulse has become asymmetrical due to channel phase distortion. FIG. 3c shows the result of first adjusting the amplitude controls of the invention. The amplitude controls compensate for the channel attenuation, which is a function of channel frequency response, in the manner previously described. This results in the narrowing of the spread pulse as shown in FIG. 3c. This adjustment only affected the pulse duration, the resultant pulse still exhibiting the asymmetry that results from channel phase distortion. FIG. 3d illustrates the effect of adjusting the phase controls of the invention while processing the pulse of FIG. 3c. Symmetry, it will be appreciated, has been restored to the signal and the channel has been expeditiously equalized.

DESCRIPTION OF THE INVENTION

Figure 4:
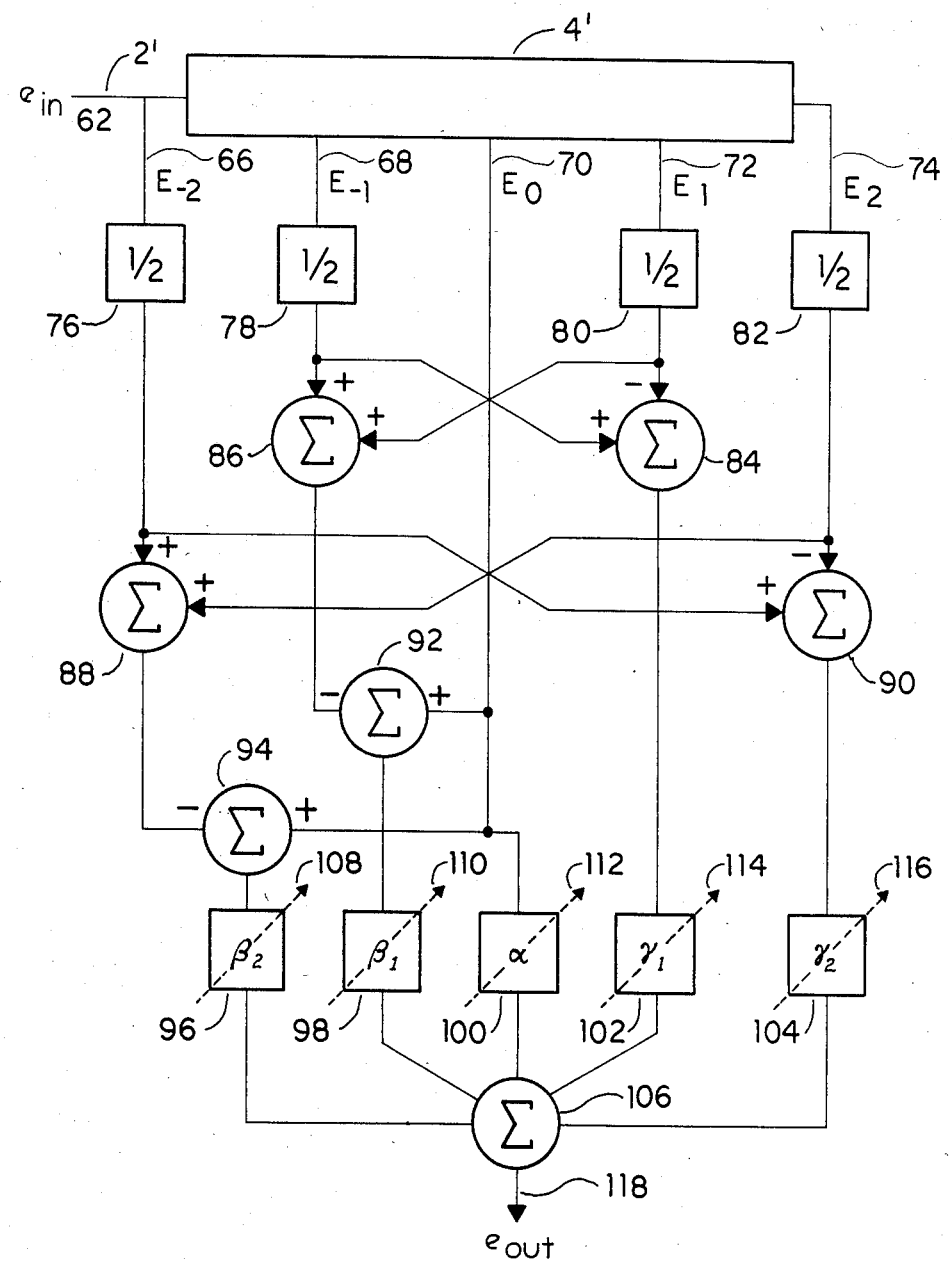
FIG. 4 is a block diagram of a transversal filter equalizer according to the invention.

The operation of the invention may be understood by reference to FIG. 4: The signal to be equalized $e_{in}$ is applied at the device's input 62, and the signal then transits a tapped delay line 4′. The delay line 4′ may be of the type previously described in connection with the transversal filter equalizer known in the prior art. Signals derived from taps 66, 68, 70, 72 and 74 are respectively designated $E_{-2}$, $E_{-1}$, $E_0$, $E_1$, $E_2$. Attenuators 76, 78, 80, 82 divide the amplitude of their respective input signals by a factor of two. There is no attenuator connected to the center tap 70.

The signal from the attenuator 80 feeds the (−) input of an adder 84, and the signal from the attenuator 78 feeds the (+) input of the adder 84. The signal output from the adder 84 is therefore $\frac{1}{2}[E_{-1}-E_1]$. As was previously suggested (FIG. 2b), when two equal amplitude symmetrically positioned signals are subtracted, their resultant is orthogonal to the reference signal $E_0$ from the center tap 70, and adjustment of the amplitude of this resultant signal upon addition to the reference signal 70 equalizes the phase of the output signal $e_{out}$ (at 118). The output signal of the adder 84 is applied to a multiplier 102, whose gain [sign and magnitude] is controlled by the equalizer's phase control adjustment 114. The output of the adder 84 has no d.c. component since it is the difference of two signals which have the same d.c. components. The output signal of the multiplier 102 therefore has no d.c. component and, since the gain of multiplier 102 is controlled by the phase adjustment 114, there is no resultant d.c. shift in the output signal of the multiplier 102.

The signal from the attenuator 80 also feeds one input of an adder 86, and the signal from the attenuator 78 feeds the other input of the adder 86. The signal output from the adder 86 is therefore $\frac{1}{2}[E_{-1}+E_1]$. As was previously suggested, when two equal amplitude symmetrically positioned signals are added, their resultant is in the same direction as the reference signal, and upon addition of such resultant to the reference signal, an amplitude equalized component of the output signal is provided. The output of the adder 86, however, has a d.c. component which is to be eliminated before such output is fed to a multiplier 98. The output of the adder 86 feeds the (−) input of an adder 92. The (+) input of the adder 92 is the center tap (70) signal. The output of the adder 92 is therefore $E_0 - \frac{1}{2}[E_{-1} + E_1]$. The d.c. components of $E_0$, $E_{-1}$ and $E_1$ are the same, and $\frac{1}{2}$ the d.c. component of $E_{-1} + E_1$ equals the d.c. component of $E_0$, and therefore the output of the adder 92 is free of a d.c. component. The signal inputs to the adder 92, i.e., $\frac{1}{2}[E_{-1} + E_1]$ and $E_0$, are vectors in the direction of the reference vector $E_0$ as previously explained; so the output of the adder 92 is also in the direction of the reference signal vector $E_0$. The output signal of the adder 92 feeds the multiplier 98 whose gain [sign and magnitude] is controlled by the equalizer amplitude adjustment 110.

The center tap 70 signal $E_0$ which has a d.c. component, feeds a multiplier 100 whose output is controlled by the equalizer reference adjustment 112. This adjustment does not affect relative equalization of the high and low frequencies but sets the absolute level of the equalization.

The outputs of the multipliers 98, 100 and 102 are added in an output adder 106 and the equalized signal 118 is the summed output of an adder 106.

This description has detailed the contribution to the equalization of one pair of taps and their associated circuits. The signals derived from the next pair of taps 66, 74 are processed in an identical manner. The tap signals $E_{-2}$, $E_2$, their associated attenuators 76, 82, the adders 88, 90, 94, and the multipliers 96, 104 contribute to the equalization of the output by correction of the higher frequency components. These higher frequency corrections add to the output by also being summed in the adder 106. Any additional pair of taps in a multitap filter equalization would be handled in an identical manner.

The invention has been described in detail with particular reference to preferred embodiments thereof, but it will be understood that variations and modifications can be affected within the spirit and scope of the invention.

What is claimed is:

1. Apparatus for providing amplitude and/or phase equalization of a channel adapted to process a signal, such apparatus comprising:
  a. means for accepting said signal, and providing therefrom, first, second, and third relatively delayed signals, wherein the delay times of said delayed signals are essentially integer multiples of a unit delay, and said second delayed signal constitutes a reference signal,
  b. first and second means for algebraically combining the first and third of said delayed signals to produce first and second resultant signals,
  c. means for combining the first of said resultant signals with said reference signal to produce a substantially d.c. free component signal,
  d. means for receiving and modifying the amplitude and sign of said component signal to provide a first partial signal to effect amplitude equalization of said channel,
  e. means for receiving and modifying the amplitude and sign of said second resultant signal to provide a second partial signal to effect phase equalization of said channel,
  f. means for receiving and modifying the amplitude and sign of said reference signal to provide a third partial signal to effect the absolute level of equalization of said channel, and
  g. means for combining said first, second and third partial signals to effect overall equalization of said channel.

2. Apparatus for equalization of amplitude distortion and/or phase distortion in a channel for transmitting a signal, such apparatus comprising:
  a. means for providing a maximum signal delay of 2n delay units, where n is an integer, said delay means disposed for receiving said signal and providing therefrom delayed versions of said signal, said versions having delays of $0, 1, 2, \ldots 2n$ of said delay units,
  b. means for adjusting amplitudes of said delayed signal versions,
  c. means for receiving a signal pair of said amplitude adjusted delayed signal versions, wherein one signal of said signal pair is delayed by m of said delay units, and the second signal of said signal pair is delayed by 2n-m of said delay units, wherein m equals the integers $0, 1, 2, \ldots n - 1$,
  d. means for combining said pair of amplitude adjusted delayed signal versions to provide a signal in phase with said delayed signal version which is delayed by n of said delay units,
  e. means for combining said pair of amplitude adjusted delayed signal versions to provide a signal orthogonal to said delayed signal version which is delayed by n of said delay units,
  f. means for adjusting magnitude and sign of said signal version which is delayed by n of said delay units, whereby the absolute level of said equalization is adjusted,
  g. means for adjusting magnitude and sign of said in-phase signal, whereby the amplitude of said equalization is adjusted,
  h. means for adjusting the magnitude and sign of said orthogonal signal, whereby the phase of said equalization is adjusted, and
  i. means for combining said adjusted signal version which is delayed by n of said delay units, said adjusted in-phase signal, and said adjusted orthogonal signal, to effect overall equalization of said channel.

3. The apparatus of claim 2 wherein said delay means is a tapped electrical delay line.

4. The apparatus of claim 2, wherein
  a. said means for adjusting amplitudes of said delayed signal versions are attenuators, whereby said delayed signal versions comprising said signal pair are adjusted for equal amplitudes,
  b. said means for combining said signal pair to provide said in-phase signal is a signal adder, and
  c. said means for combining said signal pair to provide said orthogonal signal is a signal subtracter.

5. The apparatus of claim 2, wherein said means for adjusting the magnitude and sign of said in-phase signal, of said orthogonal signal and said signal version which is delayed by n of said delay units, are adjustable multipliers.

6. Signal equalizing apparatus comprising:
  a. an array of delay elements disposed to receive said signal, and providing therefrom delayed versions of said signal at equal delay increments from 0 delay to a maximum delay,
  b. means for receiving said delayed signal version of delay equal to one half of said maximum delay, c. means for receiving a pair of said delayed signal versions, wherein the first signal of said pair is delayed by a fixed number of said delay increments less than said signal version equal to one half of said maximum delay, and the second signal of said pair is delayed by the same number of said delay increments more than said signal version of delay equal to one half of said maximum delay, d. means for adjusting the amplitudes of said delayed signal versions comprising said delayed signal pair, e. means for combining said amplitude adjusted signal pair to provide a signal in phase with said signal version of delay equal to one half of said maximum delay, f. means for combining said amplitude adjusted signal pair to provide a signal orthogonal to said signal version of delay equal to one half of said maximum delay, g. means for cancelling the d.c. component of said in-phase signal to provide a d.c. cancelled in-phase signal, h. means for cancelling the d.c. component of said orthogonal signal to provide a d.c. cancelled orthogonal signal, i. means for adjusting magnitude and sign of said signal version of delay equal to one half of said maximum delay, whereby the absolute level of equalization is adjusted, j. means for adjusting magnitude and sign of said d.c. cancelled in-phase signal, whereby amplitude equalization is adjusted, k. means for adjusting the magnitude and sign of said d.c. cancelled orthogonal signal, whereby phase equalization is adjusted, and l. means for combining said adjusted signal version of delay equal to one-half of said maximum delay, said adjusted d.c. cancelled in-phase signal, and said adjusted d.c. cancelled orthogonal signal, to effect overall signal equalizing by said apparatus.

7. The apparatus of claim 6 wherein said delay means is a tapped electrical delay line.

8. The apparatus of claim 6, wherein a. said means for adjusting amplitudes of said delayed signal versions are attenuators, whereby said delayed signal versions comprising said signal pair are adjusted for equal amplitudes, b. said means for combining said signal pair to provide said in-phase signal is a signal adder, and c. said means for combining said signal pair to provide said orthogonal signal is a signal subtracter.

9. The apparatus of claim 6, wherein said means for adjusting the magnitude and sign of said in-phase signal, of said orthogonal signal, and said signal version of delay equal to one half said maximum delay, are adjustable multipliers.

10. The apparatus of claim 6 wherein said means for cancelling said d.c. components are subtracters.

* * * * *